R. S. PEASE.
APPARATUS AND PROCESS FOR DRAWING GLASS.
APPLICATION FILED JUNE 5, 1915.
1,299,019.
Patented Apr. 1, 1919.
2 SHEETS—SHEET 2.
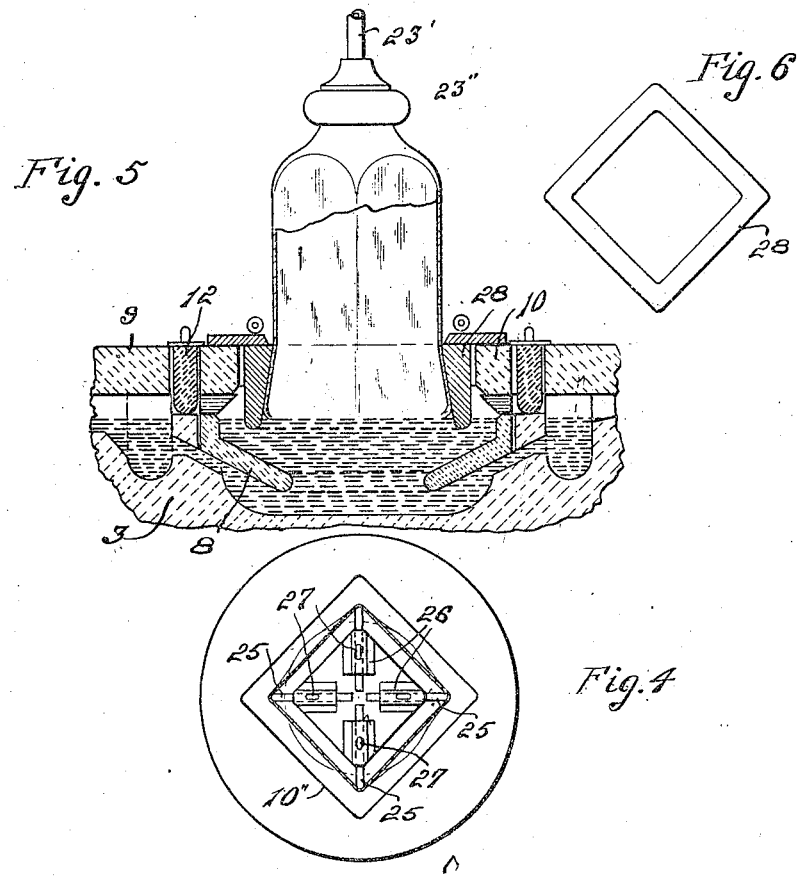
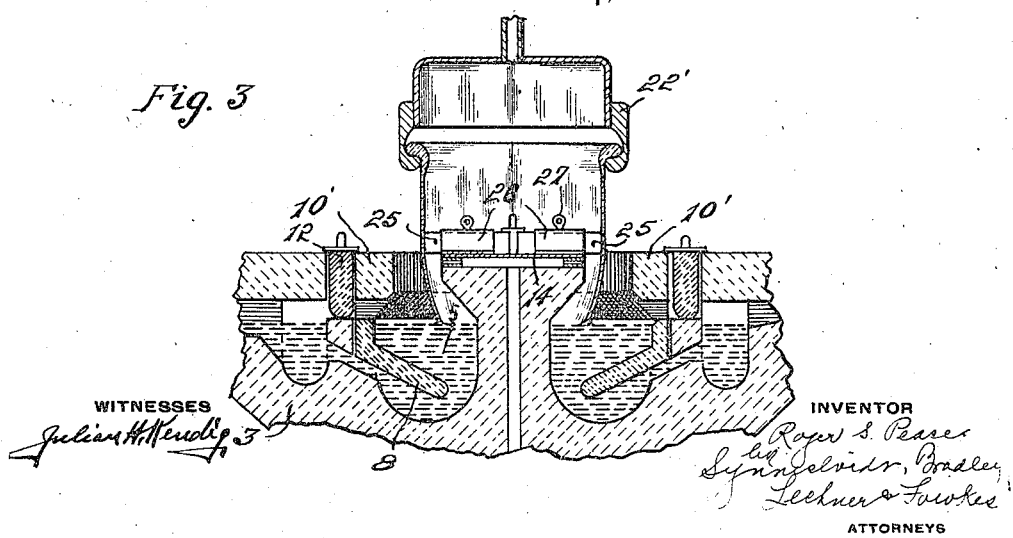

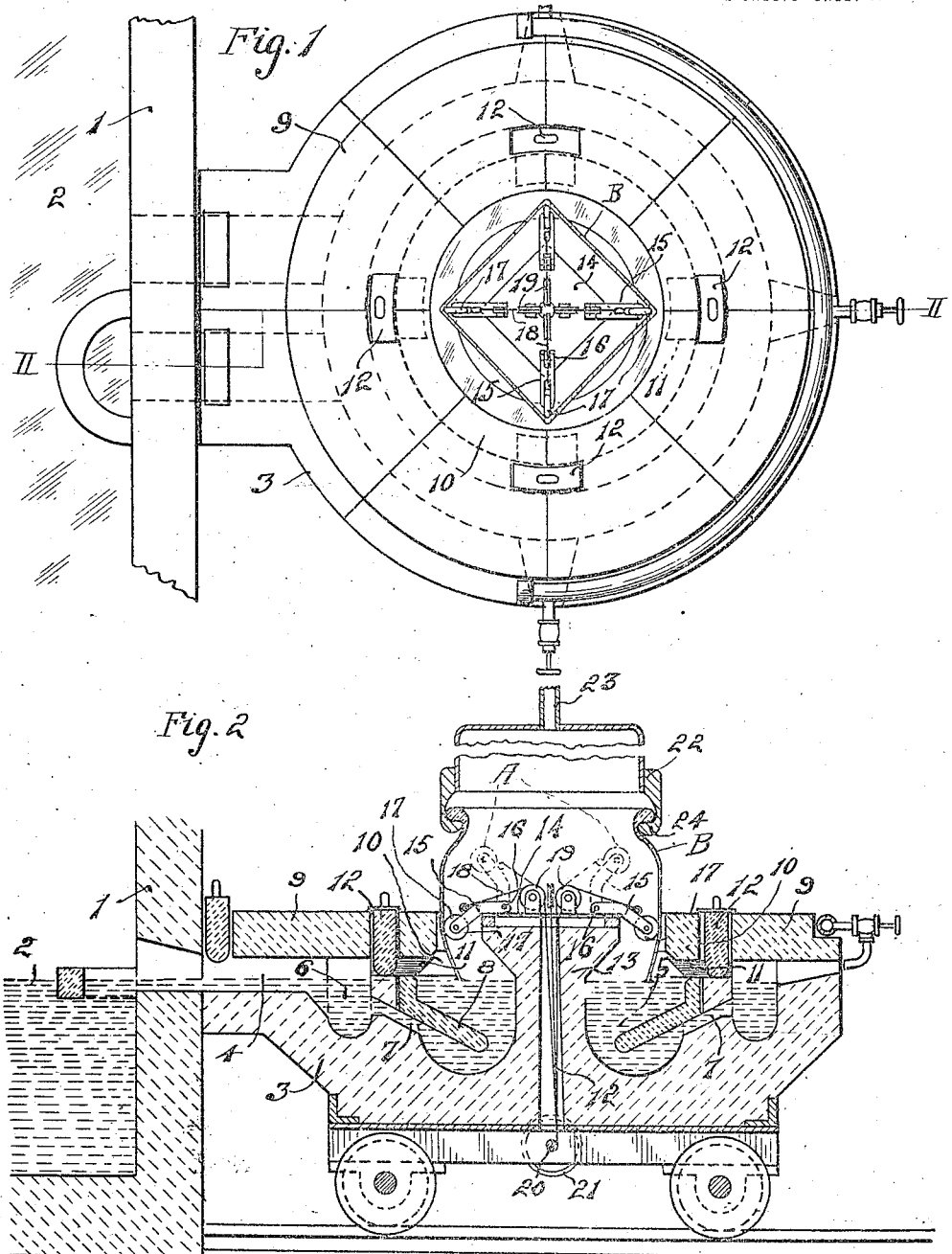

UNITED STATES PATENT OFFICE.

ROGER S. PEASE, OF PITTSBURGH, PENNSYLVANIA, ASSIGNOR TO PITTSBURGH PLATE GLASS COMPANY, OF PITTSBURGH, PENNSYLVANIA, A CORPORATION OF PENNSYLVANIA.

APPARATUS AND PROCESS FOR DRAWING GLASS.

1,299,019.  Specification of Letters Patent.  Patented Apr. 1, 1919.

Application filed June 5, 1915. Serial No. 32,364.

*To all whom it may concern:*

Be it known that I, ROGER S. PEASE, a citizen of the United States, residing at Pittsburgh, in the county of Allegheny and State of Pennsylvania, have invented a certain new and useful Apparatus and Process for Drawing Glass, of which the following is a specification.

This invention relates to apparatus and process for drawing glass articles, and more particularly to that class of apparatus for drawing window gass; and has for its principal objects, the provision of a device whereby hollow tubes of glass may be drawn having flat sides which may be cut into commercial sizes without first having to be flattened as is the practice now generally in use wherein glass cylinders are drawn and subsequently flattened by hand in an oven to form flat sheets; the provision of an apparatus whereby a superior quality and finish may be given to the finished product, and such other objects as may hereinafter appear. One embodiment of the invention, together with modifications thereof, is shown in the accompanying drawings, wherein—

Figure 1 is a plan view of the preferred form of apparatus; Fig. 2 is a longitudinal section of the apparatus taken on the line II—II of Fig. 1; Fig. 3 is a longitudinal section through a modified form of the apparatus; Fig. 4 is a plan view of a portion of the apparatus shown in Fig. 3; Fig. 5 is a longitudinal section through another modification of the device and Fig. 6 is a plan view of the forming block shown in Fig. 5.

Referring more particularly to Figs. 1 and 2 the preferred form of the apparatus consists of a glass melting tank 1 in which the molten glass 2 is melted and refined and then supplied to a forehearth 3 through the passage 4. The forehearth comprises a central drawing basin 5 supplied with molten glass from an annular compartment 6 surrounding the basin, through a plurality of spaced passages 7.

A conical drawing ring 8 is supported within the drawing basin and the glass used in forming the glass cylinders or tubes is supplied through an opening in the bottom of the said ring. The forehearth is provided with a cover 9 having a central opening surrounded by an annular depending flange 10 which abuts the top edge of the drawing ring, thereby shutting off the heat within the forehearth from the interior of the drawing ring.

A series of passages 11 cut in the lower edge of the depending flange permits heat to enter the drawing ring, the said passages being closed by means of drop gates 12. By raising and lowering these gates the temperature within the drawing ring may be regulated and uniformly maintained during the drawing operation.

The portion of the apparatus above described is more fully described in the copending application, Serial No. 32,366, the apparatus therein illustrated being a forehearth for drawing glass articles in which uniform temperature of the glass in the drawing ring may be maintained.

While the apparatus about to be described is shown in use with such a forehearth because of the uniform temperature maintained thereby, it is obvious that other forms of forehearths may be used to advantage.

Extending from the bottom of the drawing basin 5 is a pedestal 13 projecting above the surface of the glass, and upon which is mounted a metal plate 14 which carries four arms or forming members 15 pivoted to the plate at 16 and projecting radially from the center of the plate 14. The free ends of the arms 15 are provided with forming rollers 17 having rounded faces, and the arms may be raised to the position A shown in dotted lines by means of the cables 18 which are secured to the arms 15 and extend downward over pulleys 19 through a hole in the center of the pedestal 13. The lower ends of the cables 18 are secured to a horizontal shaft 20 which is operated by a hand wheel 21 which may be held in adjusted positions by any suitable locking mechanism. By winding or unwinding the cables 18 by turning the hand wheel 21, the arms 15 may be raised or lowered.

For the purpose of drawing a cylinder or tube B, a suitable bait 22 is provided, the shape of which may be round or square and beginning with the arms 15 in the position A indicated by dotted lines the operation is as follows:

The bait is first lowered into the molten glass through the opening in the cover while the gates 12 are in the position shown. At such time the raised forming arms 15 will enter the bait. After the bait has secured a gathering of glass it is slowly elevated, and if desired air may be admitted through the pipe 23 to blow out a cylinder of larger diameter than the interior of the bait collar 24. After the bait has been elevated sufficient distance for the rollers 17 on the arms 15 to clear the bait, the arms are lowered into engagement with the walls of the cylinder. As the bait continues to rise the plastic glass beneath the rollers 17 will be stretched until the curvature of the cylinder wall disappears and the sheet of glass between the rollers becomes straight and flat. The top of the cover is so positioned to maintain the proper temperature adjacent the rollers so that the glass will become chilled sufficiently to set immediately after it has passed them.

It will be noted that due to the property of cohesion, the glass beneath the rollers 17 tends to converge into a circular cross-section and the farther away from the glass the rollers are positioned the smaller will be the diameter of the cylinder where it leaves the main body of the molten glass. The rollers are, therefore, mounted so they can be raised and lowered, and when in proper position form a polygonal tube whose periphery is of slightly greater length than the circumference of the circle where it leaves the glass. Therefore, in order for the glass to pass the rollers it must be stretched, and in stretching, the wall of the cylinder extending between any two rollers is flattened and remains so on account of becoming set immediately after passing the rollers.

The cylinder below the rollers is maintained in plastic condition by heat radiated from the surface of the glass within the drawing ring and by heat admitted under the gates 12 through the passages 11 when necessary. After the polygonal tube has been formed at the start, the air supplied through the pipe 23 may be cut off, and under certain conditions may be dispensed with entirely from the beginning of the operation to the end thereof.

After the polygonal tube has been drawn it is detached from the body of glass by lifting the gates 12 and allowing the hot gases in the forehearth to melt it off at the bottom. The tube is then taken down and cut up into sheets in any suitable manner, without the necessity of flattening, which is an expensive operation and one which mars the surface of the glass.

Referring to Figs. 3 and 4, a modified form of forming members is shown, wherein blocks of bass wood or soap stone, or bars of copper 25 may be used instead of pivoted arms provided with rollers. The bars 25 are rounded at their ends and corners and are mounted in guides 26 secured as to the plate 14, and may be adjusted outwardly or toward the center of the plate and secured in adjusted position by the set screws 27. The bait 22' used with this form of forming members is of sufficient size to fit over the members 25 when it is dipped in the glass, without requiring any movement of the forming members, and a polygonal cylinder may then be drawn over the forming members in a manner similar to the operation previously described.

The cover 10' is provided with an opening 10'', similar in contour to the polygonal or square tube being drawn, such form being shown to illustrate variations which might be made in the opening in the cover to meet various operating conditions.

Figs. 5 and 6 illustrate another modified form wherein the forming member 28 consists of an under cut frame of bass-wood, soap stone, or other suitable material that will not scratch or mar the glass. This bass-wood frame is carried by the cover and serves to flatten the walls of the tube as it is being drawn, the glass being pressed against the inner face of the bass-wood or soap stone forms by means of air pressure constantly supplied to the interior of the tube by means of the pipe 23' attached to the usual form of drawing bait 23''.

In operation, the bait is first lowered into the glass and a cylinder is started in the usual manner. The bait is slowly raised and at the same time, after the neck has been formed, the pressure within the cylinder is increased until the walls of the cylinder are forced into contact with the inner face of the bass-wood or soap stone forming frame. The pressure is maintained at this point during the entire formation of the tube. The finished tube is subsequently cut off, taken down, and cut up in the manner previously described.

While the apparatus illustrated shows constructions for making tubes having four flat sides, it is obvious that tubes having more or fewer flat sides may be formed by the employment of apparatus similar to that above described, and that many changes in detail might be made without departing from the spirit of my invention.

What I claim is:

1. In combination in a glass drawing apparatus, means for drawing a glass tube from a body of molten glass, and means for forming it into a polygonal tube comprising a plurality of forming members engaging the walls of the tube at spaced points only and adapted to flatten the said walls as the tube is drawn past the forming members.

2. In combination in a glass drawing apparatus, means for drawing a glass tube from a body of molten glass, and means for forming it into a polygonal tube comprising a plurality of spaced forming members engaging the walls of the tube at remote points only and adapted to flatten the walls thereof extending between the forming members as the tube is drawn past the said forming members.

3. In combination in a glass drawing apparatus, means for drawing a glass tube from a body of molten glass, and means for forming it into a polygonal tube comprising a plurality of spaced forming members engaging the interior surface of the walls of the tube at remote points only and adapted to flatten them as the tube is drawn past the forming members.

4. In combination in a glass drawing apparatus, means for drawing a glass tube from a body of molten glass, and means for forming it into a polygonal tube comprising a plurality of radially disposed forming members engaging the glass at spaced points only and adapted to flatten the walls of the tube between such points as the tube is drawn past the forming members.

5. In combination in a glass drawing apparatus, means for drawing a glass tube from a body of molten glass, and means for forming it into a polygonal tube comprising a plurality of spaced forming members engaging the walls of the tube at remote points only and adapted to stretch the glass extending between the forming members into flat surfaces as the tube is being drawn past the forming members.

6. In combination in a glass drawing apparatus, means for drawing a glass t from a body of molten glass, and means for forming it into a polygonal tube comprising a plurality of radially spaced forming members having contact rollers engaging the walls of the tube at remote points only and adapted to flatten the walls thereof extending between the forming members as the tube is drawn past the said forming members.

7. In combination in a glass drawing apparatus, means for drawing a glass tube from a body of molten glass, and means for forming it into a polygonal tube comprising a plurality of adjustably mounted spaced forming members engaging the walls of the tube at remote points only and adapted to flatten them as the tube is drawn past the forming members.

8. In combination in a glass drawing apparatus, means for drawing a glass tube from a body of molten glass, and means for forming it into a polygonal tube comprising a plurality of spaced pivoted forming members engaging the walls of the tube at remote points only and adapted to flatten them as the tube is drawn past the forming members.

9. In combination in a glass drawing apparatus, means for drawing a glass tube from a body of molten glass, and means for forming it into a polygonal tube comprising a plurality of forming members engaging the walls of the tube at remote points only and adapted to flatten the said walls before the glass has become set, and as the tube is drawn past the forming members.

10. In combination in a glass drawing apparatus, means for drawing a glass tube from a body of molten glass, means for forming it into a polygonal tube, a plurality of spaced forming members engaging the walls of the tube at remote points only and adapted to stretch under tension the glass extending between the forming members, into flat surfaces as the tube is being drawn past the forming members, and means for regulating the tension applied by the forming members.

11. In combination in a glass drawing apparatus, means for drawing a glass tube from a body of molten glass, (means for forming it into a polygonal tube comprising a plurality of spaced forming members engaging the walls of the tube at remote points only and adapted to flatten the said walls as the tube is drawn past the forming members, and means for varying the relative position of the flattening members with respect to the surface of the molten glass.

12. In combination in a glass drawing apparatus, means for drawing a glass tube from a body of molten glass, means for forming it into a polygonal tube comprising a plurality of forming members engaging the walls of the tube at remote points only and adapted to flatten the said walls before the glass has become set and as the tube is drawn past the forming members, and a shield for regulating the temperature of the glass adjacent the forming members.

13. The herein described process of forming window glass, which consists in drawing from a body of molten glass a glass tube and then in forming the tube into a polygonal tube by drawing it over a plurality of stretching members engaging the walls of the tube at separate remote points only to flatten the glass between such points before the glass in the tube sets.

14. The herein described process of forming window glass, which consists in drawing from a body of molten glass a glass cylinder, and then in forming the cylinder into a polygonal tube by drawing it over a plurality of stretching members engaging the walls of the cylinder at separate remote points to flatten the glass between such points before the glass in the cylinder sets.

15. In combination in a glass drawing apparatus, means for drawing a glass cylinder from a body of molten glass, and means for forming the cylinder into a polygonal tube comprising a plurality of spaced forming members engaging the walls of the cylinder at remote points only and adapted to flatten the walls thereof extending between the forming members as the tube is drawn past the said forming members.

ROGER S. PEASE.